Patented Oct. 5, 1926.

1,601,754

UNITED STATES PATENT OFFICE.

ERNEST E. HENDY, OF MONTPELIER, VERMONT.

POLISH.

No Drawing.   Application filed March 22, 1926.   Serial No. 96,617.

My invention relates to liquid polishes and has as its principal object to provide an improved polish particularly adapted for use in connection with automobiles, furniture and the like.

Another object of the invention is to provide a compound of this general character which will effectually clean the surface to be polished and thereby restore its luster and color.

My improved polish preferably consists of the following ingredients combined in the proportions stated:

| | |
|---|---|
| Hydrocarbon oil | 3 ounces. |
| Turpentine | 2 ounces. |
| Pumice stone water | 2 drops. |
| Vinegar | 2 drops. |
| Japan dryer | 2 drops. |
| Varnish | 1 ounce. |
| Color brown | 3 drops. |
| Water | 1 teaspoonful. |
| Kerosene | 1 teaspoonful. |
| Toilet soap | 1 ounce. |
| Shellac | 1 ounce. |

The hydrocarbon oil used in this compound is preferably a heavy oil and more particularly a medium heavy oil.

The pumice stone water is prepared by soaking pumice stone in water and agitating it therein until the resulting solution contains pumice stone in suspension in a finely comminuted state. This pumice stone water forms a very mild abrasive and is effective as a cleaning agent.

Notwithstanding the fact that all of the ingredients mentioned contribute to the value and efficiency of the polish, I consider the following ones to be of prime importance for the production of a successful polish: hydrocarbon oil, turpentine, pumice stone water, Japan dryer, varnish and soap.

While I have found that the compound prepared in the proportions stated above produces the best results, I do not wish to confine myself to these exact proportions as slight variations therein may be made without departing from the spirit of my invention.

I claim:—

A polish containing the following ingredients in the proportions stated:

| | |
|---|---|
| Hydrocarbon oil | 3 ounces. |
| Turpentine | 2 ounces. |
| Pumice stone water | 2 drops. |
| Vinegar | 2 drops. |
| Japan dryer | 2 drops. |
| Varnish | 1 ounce. |
| Color brown | 3 drops. |
| Water | 1 teaspoonful. |
| Kerosene | 1 teaspoonful. |
| Toilet soap | 1 ounce. |
| Shellac | 1 ounce. |

In testimony whereof I affix my signature.

ERNEST E. HENDY.